(12) United States Patent
Yen

(10) Patent No.: US 7,168,819 B2
(45) Date of Patent: Jan. 30, 2007

(54) BACKLIGHT MODULE HAVING LIGHT DIFFUSING DEVICE

(75) Inventor: Chao-Shih Yen, Taitung (TW)

(73) Assignee: Forward Electronics Co., Ltd., Taipei (TW)

(*) Notice: Subject to any disclaimer, the term of this patent is extended or adjusted under 35 U.S.C. 154(b) by 43 days.

(21) Appl. No.: 11/124,088

(22) Filed: May 9, 2005

(65) Prior Publication Data
US 2006/0133106 A1 Jun. 22, 2006

(30) Foreign Application Priority Data
Dec. 17, 2004 (TW) .............................. 93220370 U

(51) Int. Cl.
*F21V 3/02* (2006.01)
*G01D 11/28* (2006.01)
*G02F 1/1335* (2006.01)

(52) U.S. Cl. .................... 362/29; 362/30; 362/561; 362/633; 349/58; 349/64

(58) Field of Classification Search .............. 362/29, 362/30, 561, 633; 349/58, 64
See application file for complete search history.

(56) References Cited
FOREIGN PATENT DOCUMENTS
JP 2003297120 A 10/2003

*Primary Examiner*—Sandra O'Shea
*Assistant Examiner*—James W Cranson, Jr.
(74) *Attorney, Agent, or Firm*—Bacon & Thomas PLLC

(57) ABSTRACT

A backlight module having a light diffusing device is disclosed, comprising a frame, a reflecting plate, a top plate and at least one light source module, in which the reflecting plate having an upper surface is mounted on a bottom side of the frame and the top plate is mounted on a top side of the frame to space a predetermined distance from the reflecting plate. The light source module is mounted on the upper surface of the reflecting plate, including a light source and a light diffusing device mounted between the light source and the top plate. The light diffusing device has an un-uniform thickness which is inversely proportional to the distance between the light source and the top plate. Thus, the problem of non-uniform luminance distribution caused by a change in the distance between the light source and the top plate is eliminated.

9 Claims, 4 Drawing Sheets

BACKLIGHT MODULE HAVING LIGHT DIFFUSING DEVICE

BACKGROUND OF THE INVENTION

1. Field of the Invention

The present invention relates to a backlight module having a light diffusing device and, more particularly, to a device suitable for a direct-type backlight module to uniformly diffuse light rays emanating from a light source.

2. Description of Related Art

In general, a large-sized liquid crystal panel uses a direct-type backlight module to generate light, the direct-type backlight module including a lamp (a light source), a light diffusing plate, a reflecting plate and a frame. The luminance distribution of the backlight module, whether it is uniform or not, depends on the design of the components of the aforesaid direct-type backlight module.

Traditionally, to provide the backlight module with a uniform luminance distribution of light rays, a component such as the light diffusing plate is subject to a dim process, or alternatively, a diffuser film is disposed on the light diffusing plate. However, it causes not only the luminance of the whole backlight module to be reduced but also damages to the diffuser film as a result of heat generated by the lamp. Hence, the distance between the lamp and the light diffusing plate has to be increased. As a result, the thickness of the whole backlight module is increased. Furthermore, a change in the distance between the lamp and the light diffusing plate causes the backlight module to have a non-uniform luminance distribution, impairing the quality of the backlight module.

In addition, another known method for eliminating the aforesaid problems is to have the light diffusing plate screen-printed directly so as to form a plurality of dotted patterns for shielding light on the surface of the light diffusing plate. Thus, the problem of non-uniform luminance distribution caused by the change in the distance between the lamp and the light diffusing plate is solved. However, this still reduces the luminance of the whole backlight module, and needs to be improved.

Therefore, it is desirable to provide an improved backlight module having a light diffusing device to mitigate and/or obviate the aforementioned problems.

SUMMARY OF THE INVENTION

Accordingly, the present invention provides a backlight module having a light diffusing device, comprising a frame, a reflecting plate, a top plate and at least one light source module, in which the reflecting plate having an upper surface is mounted at a bottom side of the frame and the top plate is mounted on a top side of the frame to space a predetermined distance from the reflecting plate.

In addition, the at least one light source module is mounted on the upper surface of the reflecting plate, including a light source and a light diffusing device mounted between the light source and the top plate.

The aforesaid light diffusing device has an un-uniform thickness which is inversely proportional to the distance between the light source and the top plate. Thus, the present invention is capable of eliminating the problem of non-uniform luminance distribution caused by the change in the distance between the light source and the top plate with the design of the light diffusing device. The luminance provided by the backlight module is uniform without impairing the luminance of the backlight module. Also, the distance between the light source and the top plate is shortened. Hence, the thickness of the whole backlight module is reduced to achieve a light-weight, thin and low-profile design.

The light diffusing device of the present invention can be directly enclosed in the external wall of the light source, the external wall being either a continuous curve such as a circle and an ellipse in cross-section or a non-continuous curve such as a polygon in cross-section. Similarly, the internal wall of the light diffusing device is either a continuous curve such as a circle and an ellipse in cross-section or a non-continuous curve such as a polygon in cross-section. Furthermore, the light diffusing device is made of translucent material while the top sheet is made of transparent material; or conversely, the light diffusing device is made of transparent material while the top sheet is made of translucent material to achieve the same result. The light diffusing device is made of a thermosetting material such as transparent rubber, silica gel, epoxy resin, phenolic (PMC) resin, melamine (MMC) resin, unsaturated polyester (UPC) resin, polyamide resin and polyimide resin; a thermoplastic material such as polythene (PE) resin, polyvinyl chloride (PVC) resin, polystyrene (PP) resin, polymethyl methacrylate (PMMA) resin, polycarbonate (PC) resin and polybutylene terephthalate (PBT) resin; or a glass. A transparent glass is the most preferable for its heat-resistant capability so as to not only shorten the predetermined distance between the light diffusing device and the top plate but also reduce the thickness of the whole backlight module.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
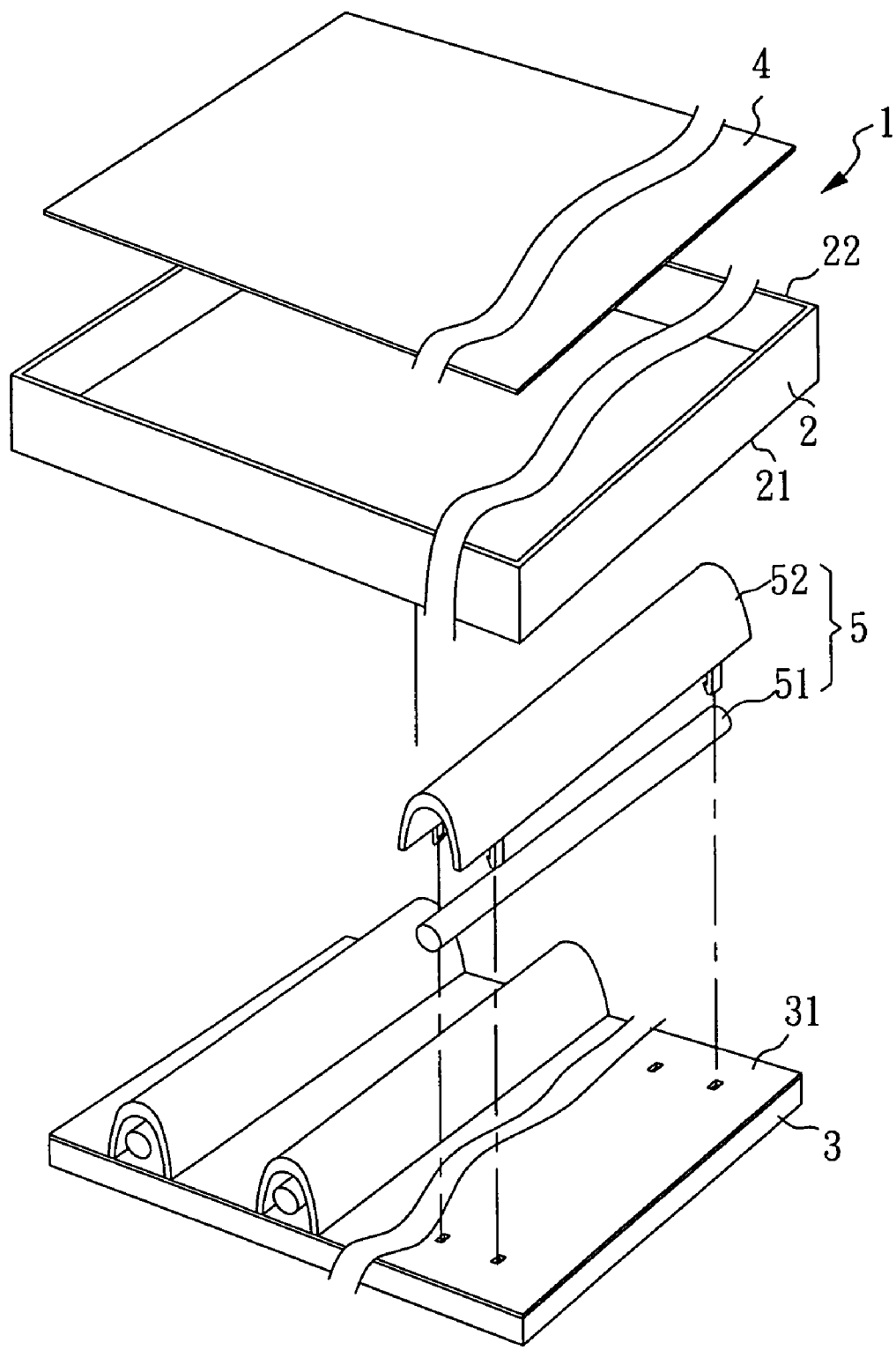
FIG. 1 is an exploded perspective view of a first preferred embodiment of the present invention.

Referring to FIG. 1 that illustrates an exploded perspective view of the first preferred embodiment of the present invention, a backlight module 1 having a light diffusing device is shown. The backlight module 1 comprises a frame 2, a reflecting plate 3, a top plate 4, and a plurality of light source modules 5. In FIG. 1, three light source modules 5 are disclosed.

Figure 2:
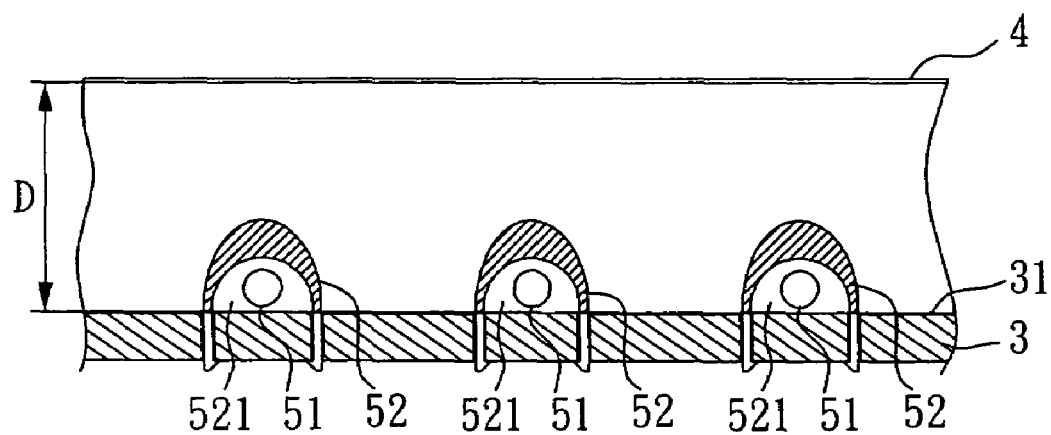
FIG. 2 is a cross-sectional view of the first preferred embodiment of the present invention.

Referring to both FIG. 1 and FIG. 2 that illustrates a cross-sectional view of the first preferred embodiment of the present invention, the reflecting plate 3 having an upper surface 31 is connected to a bottom side 21 of the frame 2, and also, the top plate 4 is mounted on a top side 22 of the frame 2. Thus, a cavity is formed among the frame 2, the reflecting plate 3 and the top plate 4 spaced at a predetermined distance D from the reflecting plate 3.

In addition, the aforesaid light source modules 5 are mounted on the upper surface 31 of the reflecting plate 3, each of which including a light source 51 and a light diffusing device 52. In this embodiment, the light source 51 is a lamp, and also, the light diffusing device 52 is disposed between the light source 51 and the top plate 4.

Figure 3:
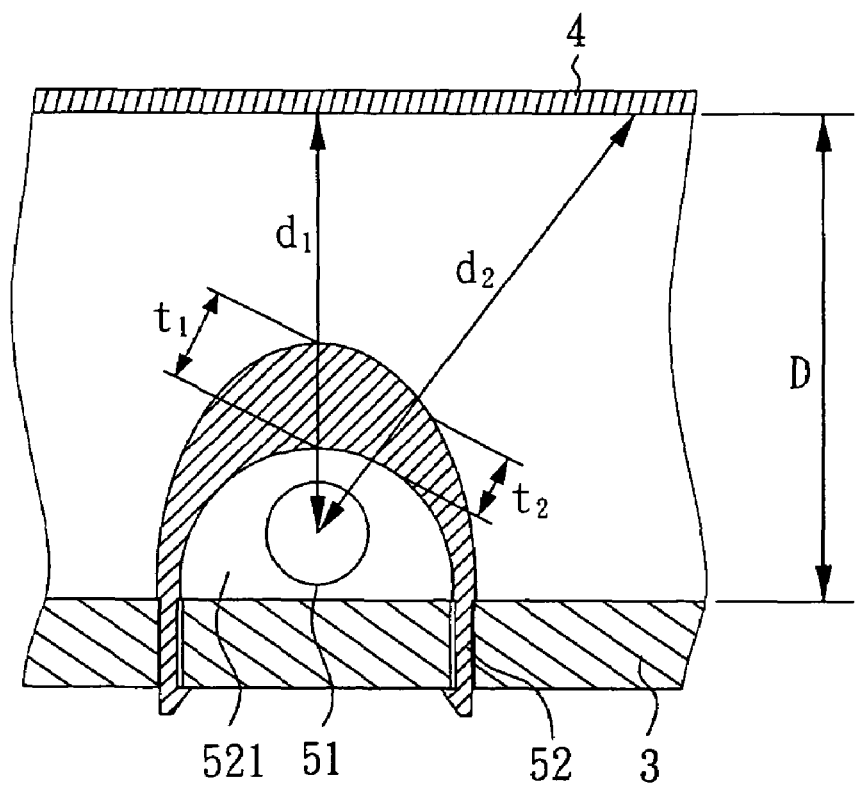
FIG. 3 is an enlarged cross-sectional view of the first preferred embodiment of the present invention.

Referring to FIG. 1, FIG. 2 and FIG. 3 that illustrates an enlarged cross-sectional view of the first embodiment of the present invention, the light diffusing device 52 is made of a translucent material while the top plate 4 is made of a transparent material in this embodiment. Also, the light diffusing device 52 has thicknesses t1, t2 inversely proportional to the distances d1, d2 between the light source 51 and the top plate 4. Hence, the light source 51 is diffused uniformly. In other words, light rays emanating from the light source 51 are uniformly shed on the top plate 4 by the design where the thicknesses t1, t2 of the light diffusing device 52 are inversely proportional to the distances d1, d2 between the light source 51 and the top plate 4.

In the aforesaid design, an internal hollow channel 521 is formed within the light diffusing device 52, correspondingly accommodated the light source 51 therein. In addition, the light diffusing device 52 is U-shaped in cross-section. The external wall of the light diffusing device 52 is a continuous parabolic curve in cross-section, and the internal wall of the light diffusing device 52 is a continuous circular curve in cross-section. It is certain that the light diffusing device 52 can be enclosed in the external wall of the light source 51 as manufactured.

Hence, the aforesaid arrangement, along with the design of the light diffusing device 52, can eliminate the problem of non-uniform luminance distribution caused by a change in the distance between the light source 51 and the top plate 4. The backlight module 1 can provide a uniform luminance distribution without impairing the luminance thereof. Also, the distance between the light source 51 and the top plate 4 is shortened because of the characteristic of heat-resistant capability of a transparent glass. As a result, the thickness of the whole backlight module 1 is reduced to provide a light-weight, thin and low-profile design.

Figure 4:
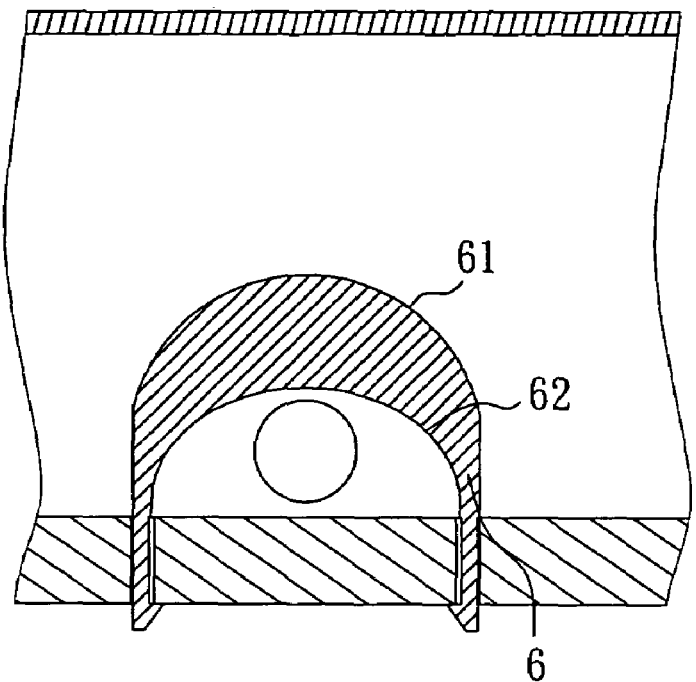
FIG. 4 is an enlarged cross-sectional view of a second preferred embodiment of the present invention.

Referring now to FIG. 4 that illustrates an enlarged cross-sectional view of a second preferred embodiment of the present invention, the primary structure of this embodiment is the same as the above-mentioned first embodiment, except that the external wall 61 of a light diffusing device 6 is a continuous circular curve in cross-section and the internal wall 62 of the light diffusing device 6 is a continuous parabolic curve in cross-section. Thus, the light diffusing device 6 is designed in a manner contrary to the above-mentioned first embodiment. Even so, the advantages achieved by the first embodiment remain in this embodiment.

Figure 5:
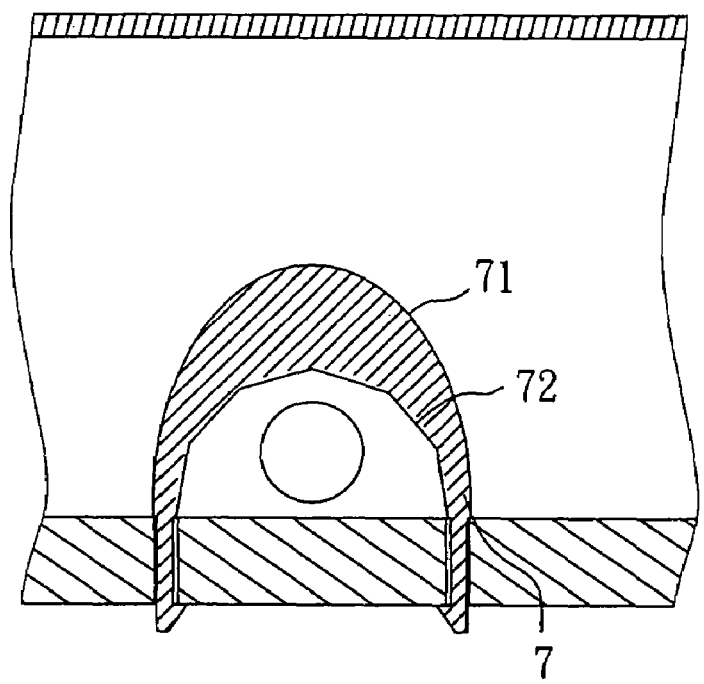
FIG. 5 is an enlarged cross-sectional view of a third preferred embodiment of the present invention.

Referring now to FIG. 5 that illustrates an enlarged cross-sectional view of a third preferred embodiment of the present invention, the primary structure of this embodiment is the same as the above-mentioned first embodiment, except that the external wall 71 of a light diffusing device 7 is a continuous parabolic curve in cross-section and the internal wall 72 of the light diffusing device 7 is a non-continuous polygonal segment in cross-section. Even so, the advantages achieved by the aforesaid embodiments remain in this embodiment.

Figure 6:
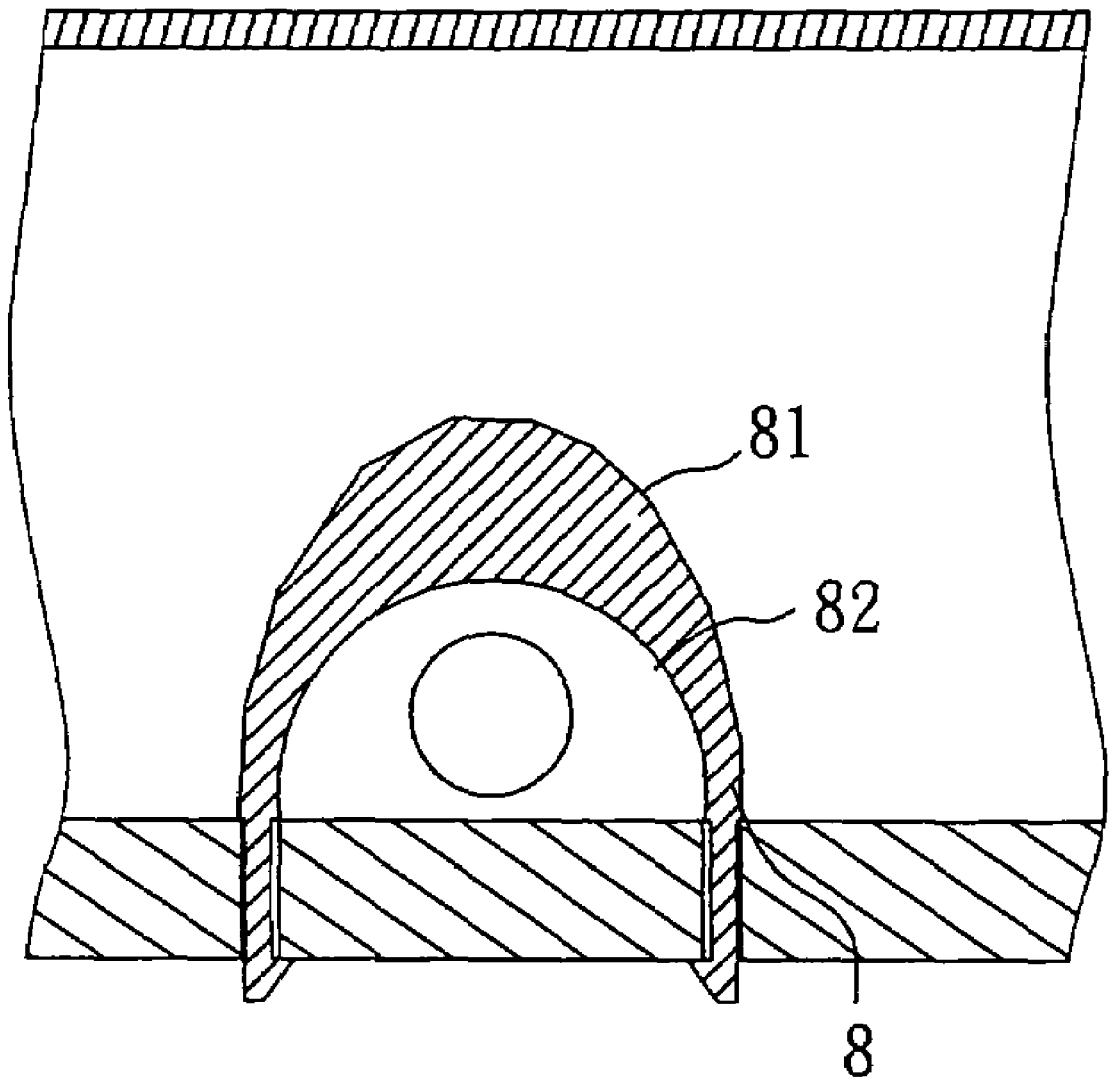
FIG. 6 is an enlarged cross-sectional view of a forth preferred embodiment of the present invention.

Referring now to FIG. 6 that illustrates an enlarged cross-sectional view of a forth preferred embodiment of the present invention, the primary structure of this embodiment is the same as the above-mentioned first embodiment, except that the external wall 81 of a light diffusing device 8 is a non-continuous polygonal segment in cross-section and the internal wall 82 of the light diffusing device 8 is a continuous parabolic curve in cross-section. Even so, the advantages achieved by the aforesaid embodiments remain in this embodiment.

It is inferable from the above that the internal wall and external wall of the light diffusing device can be formed in various shapes. For example, the cross-section of the external wall is shaped as a circle, an ellipse or another continuous curve; or alternatively, the cross-section of the external wall is shaped as a non-continuous polygonal segment. Similarly, the cross-section of the internal wall of the light diffusing device is shaped as an ellipse, a circle or another continuous curve; or alternatively, the cross-section of the internal wall of the light diffusing device is shaped as a non-continuous polygonal segment.

On the other hand, referring to FIG. 1, FIG. 2 and FIG. 3 again, in the first embodiment, the top plate 4 is made of a transparent glass having heat-resistant capability so as to not only shorten the predetermined distance D between the top plate 4 and the reflecting plate 3 but also reduce the thickness of the whole backlight module 1. Nevertheless, the top plate 4 can be made of a transparent rubber, silica gel or any other transparent material; or conversely, the light diffusing device 52 is made of a transparent material while the top plate 4 is made of a translucent material.

Although the present invention has been explained in relation to its preferred embodiments, it is to be understood that many other possible modifications and variations can be made without departing from the spirit and scope of the invention as hereinafter claimed.

What is claimed is:

1. A backlight module having a light diffusing device, comprising:
   a frame;
   a reflecting plate mounted on a bottom side of said frame, said reflecting plate having an upper surface;
   a top plate mounted on a top side of said frame, said top plate spaced a predetermined distance from said reflecting plate; and
   at least one light source module mounted on said unper surface of said reflecting plate, said at least one light source module each including a light source and a light diffusing device mounted between said light source and said top plate;
   wherein said light diffusing device has an un-uniform thickness which is inversely proportional to the distance between said light source and said top plate; and,
   wherein said light diffusing device has an internal hollow channel correspondingly accommodated said light sourcetherein.

2. The backlight module having a light diffusing device of claim 1, wherein said light diffusing device is U-shaped in cross-section.

3. The backlight module having a light diffusing device of claim 1, wherein said light diffusing device comprises an external wall of non-continuous segment in cross-section.

4. The backlight module having a light diffusing device of claim 1, wherein said light diffusing device comprises an internal wall of non-continuous segment in cross-section.

5. The backlight module having a light diffusing device of claim 1, wherein said light diffusing device is made of translucent material while said top plate is made of transparent material.

6. A backlight module having a light diffusing device, comprising:
- a frame;
- a reflecting plate mounted on a bottom side of said frame, said reflecting plate having an upper surface;
- a top plate mounted on a top side of said frame, said top plate spaced a predetermined distance from said reflecting plate; and
- at least one light source module mounted on said upper surface of said reflecting plate, said at least one light source module each including a light source and a light diffusing device mounted between said light source and said top plate;
- wherein said light diffusing device has an un-uniform thickness which is inversely proportional to the distance between said light source and said top plate; and,
- wherein said light diffusing devise comprises an external wall of continuous curve in cross-section.

7. The backlight module having a light diffusing device of claim 6, wherein the external wall of said light diffusing device has a parabolic curve in cross-section.

8. A backlight module having a light diffusing device, comprising:
- a frame;
- a reflecting plate mounted on a bottom side of said frame, said reflecting plate having an upper surface;
- a top plate mounted on a top side of said frame, said top plate spaced a predetermined distance from said reflecting plate; and
- at least one light source module mounted on said upper surface of said reflecting plate, said at least one light source module each including a light source and a light diffusing device mounted between said light source and said top plate;
- wherein said light diffusing device has an un-uniform thickness which is inversely proportional to the distance between said light source and said top plate; and,
- wherein said light diffusing device comprises an internal wall of continuous curve in cross-section.

9. The backlight module having a light diffusing device of claim 8, wherein the internal wall of said light diffusing device has a circular curve in cross-section.

* * * * *